April 4, 1939. A. H. HABERSTUMP 2,153,418
SEAL CONSTRUCTION
Filed June 22, 1936
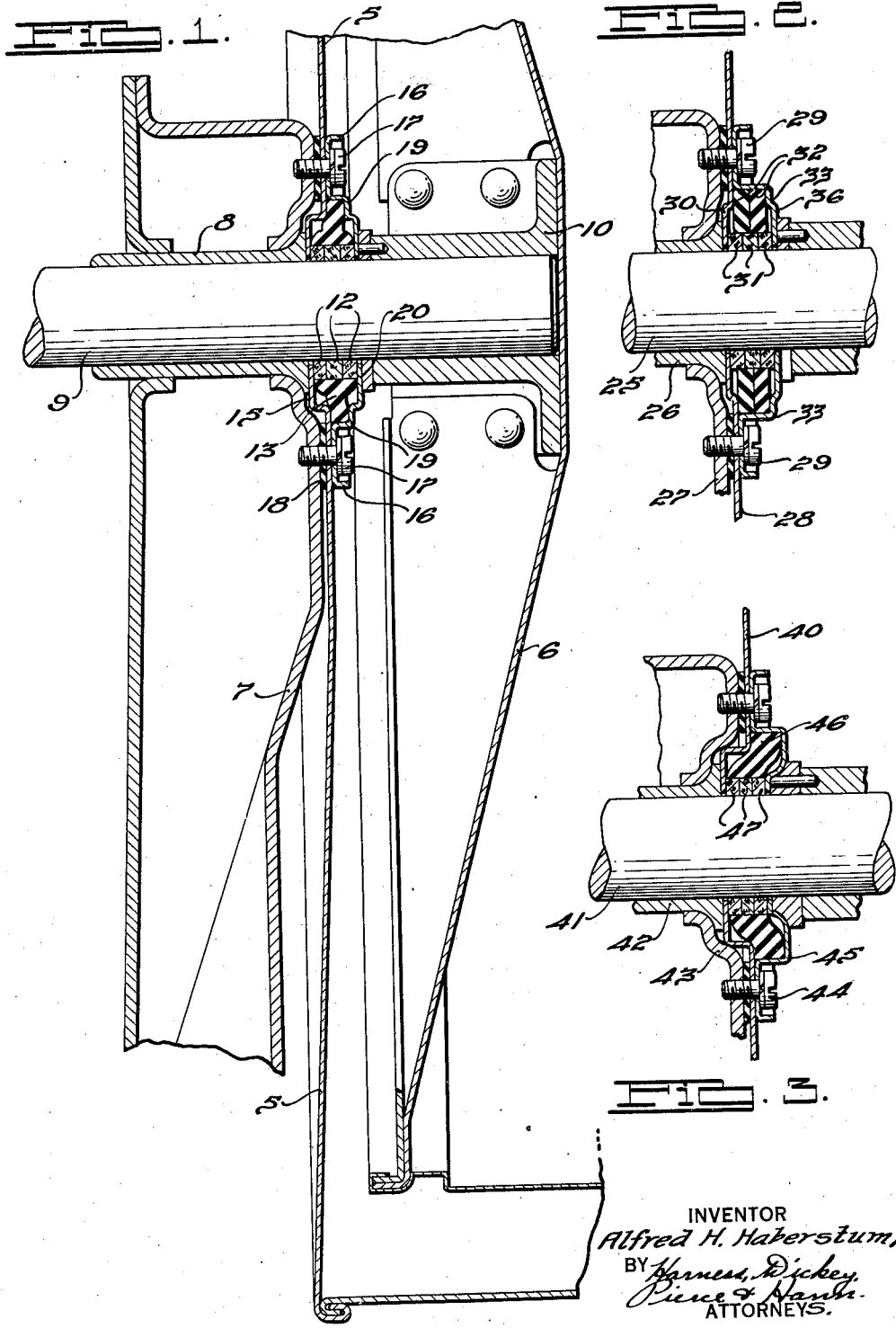
INVENTOR
Alfred H. Haberstump.
BY Harness, Dickey,
Pierce & Hanh.
ATTORNEYS.

Patented Apr. 4, 1939

2,153,418

UNITED STATES PATENT OFFICE 2,153,418

SEAL CONSTRUCTION

Alfred H. Haberstump, Detroit, Mich., assignor to The Murray Corporation of America, a corporation of Delaware Application June 22, 1936, Serial No. 86,472

2 Claims. (Cl. 286—5)

This invention relates to seal constructions for shafts. More particularly it relates to a novel type of bearing construction having arranged in combination therewith effective means serving to prevent the passage of fluid along the shaft which the bearing serves to mount.

While the specific embodiment of the invention illustrated in the drawing discloses the novel sealing bearing construction utilized in connection with the drive shaft of a horizontal axis washing machine, it will be apparent that the inventive concept presented in this application is directed specifically to a bearing construction irrespective of the particular apparatus with which it is associated. Consequently it will be apparent that the novel features of the present invention will find wide and practical utility when used in connection with many other and various types of apparatus, such, for example, as water pumps, valve mechanisms and fluid distribution systems, generally.

It is a principal object of the present invention to provide a seal adapted to be associated with a shaft, which seal is particularly effective to prevent the movement of fluid along the shaft and at the same time is exceedingly simple in construction and economically fabricated.

Still further, the present invention contemplates the provision of a seal adapted to be associated with a shaft, the sealing means which actually engages the shaft being so mounted that slight eccentric movement of the shaft does not serve to materially increase the wear imposed upon the sealing means.

Still further, the present invention contemplates the provision of a construction in which a housing member is provided with an aperture therein through which a rotatable shaft passes. A plurality of sealing washers are constructed and arranged to closely fit around the shaft adjacent the point where this shaft passes through the aperture in the partition wall. An annular resilient member serves to engage the peripheral surface of these sealing washers and this annular resilient member is tightly secured in sealing relation to the partition wall, thus providing a construction in which resilient mounting means are provided for the sealing washers and a tight and effective seal between the surface of the shaft and the partition wall is obtained.

Still further, the present invention contemplates the provision of a construction in which sealing means are provided around a shaft, the sealing means being entirely independent of and resiliently movable with respect to the bearing in which the shaft is journaled.

Many other and further advantages and features of novelty will become clearly apparent from the following specification when considered in connection with the accompanying drawing, in which:

Figure 1 is a vertical sectional view through one axial end of a washing machine, illustrating one embodiment of the present invention;

Fig. 2 is a vertical sectional view, similar to Fig. 1, illustrating a further embodiment of the invention, disclosing a modified form of sealing means;

Fig. 3 is a fragmentary vertical sectional view, similar to Figs. 1 and 2, illustrating a still further modified form of the apparatus of the present invention, disclosing a construction designed to permit greater relative movement of the shaft with respect to the structure in which it is mounted.

While, as has been explained above, the novel features of the present invention will find broad and practical utility in many other fields, the particular specific embodiment of the invention illustrated in the present application is shown as utilized for the purpose of providing a tight and effective seal for the driving shaft of a domestic type of washing machine. The washing machine includes an outer casing 5 in which is mounted a washing drum 6. Both of these members may be conveniently formed of sheet metal parts as is conventional in the art and are of such size and shape that the washing drum is adapted to be disposed within the housing 5. The housing 5 as a whole is carried by a sheet metal supporting member 7 which serves to support the structure as a whole and is adapted to be directly secured to the housing as hereinafter described in detail. This support 7 has adjacent its upper end a pair of coaxially disposed apertures in which is press fitted a bushing or bearing sleeve 8 which serves to provide means for rotatably mounting a drive shaft member 9. The shaft 9 is cylindrical in outer configuration and passes through a suitable aperture in the wall of the housing 5 and has its inner end received within a casting 10 secured to the drum 6 and serving to rotatably mount one end of the drum within the housing 5.

In practice, the housing 5 is adapted to be partially filled with water and consequently it is essential that some effective means be provided for preventing axial movement of the water within the housing along the shaft 9, thus permitting the same to escape. It is likewise virtually essential that the sealing means provided be sufficiently tight and effective so that it not only prevents the escape of water along the shaft 9, but prevents any of the fluid within the tank 5 obtaining access to the bearing sleeve or bushing 8.

The sealing means forming the basis of the present invention include a plurality of sealing washers 12 which are resilient to some extent and which have a normal inside diameter less than the outside diameter of the shaft 9 to closely surround and fit the same. While these washers 12 may be formed of many and various different compositions, it has been found particularly desirable to form them from granulated cork having a rubber binder which produces a sealing washer having extremely long wearing characteristics, particularly in installations of this general type in which the surface pressure to which the washers are disposed is relatively light. The inside diameter of these washers is at the time of their formation preferably slightly less than the diameter of the shaft 9 with which they are associated so that when they are slipped over the shaft they will be to some extent radially tensioned and provide an effective water-tight seal with respect to the shaft. The washers 12 are radially confined by, and bonded to an annular resilient ring 13 formed of any suitable resilient material, such, for example, as rubber, and having an inner radial face of sufficient width to engage the outer surface of all three of the cork composition sealing washers surrounding the shaft. The radially outward portion of the ring 13 is of considerably less axial length than the portion which is bonded to the washers 12 and provides simple means for effectively sealing this portion of the annular member 13 to the housing 5.

As will be seen by reference to each of the figures of the drawing, the wall of the housing 5 adjacent the aperture therein through which the shaft 9 passes, is offset outwardly to provide a flange 15 lying in a plane substantially parallel to the end wall of the housing, but offset therefrom in order to provide clearance for the sealing washers. An annular cover plate 16 is adapted to be secured to the wall of the housing 5 by means of an annular series of bolts 17, which bolts may pass through the cover plate 16, the housing 5 and be threadably received in the supporting member 7. As is illustrated in the drawing, an annular packing strip 18 is formed of rubber or other similar suitable material, may be interposed between the housing 5 and the support 7 in order to provide a slightly resilient connection between these two members and at the same time provide a fluid-tight seal around the holes through which the bolts 17 pass.

The cover plate 16 is offset around the marginal edge of the opening to provide a shouldered recess 19 which, together with the end wall of the housing 5, provides an annular inwardly presented channel surrounding the aperture in the housing. This channel is adapted to receive the outer peripheral portion of the annular resilient ring 13 and is preferably of such a configuration that it serves to axially compress this ring to some extent. The cover plate 16 is further provided with an offset flange 20 which extends around the opening through which the shaft 9 passes and provides between it and the wall of the housing ample clearance for the sealing rings 12.

While the composite sealing ring including the cork washers 12 and the annular resilient member 13 may be formed in various different ways, in the preferred embodiment of the invention illustrated in Fig. 1 this member is preferably formed by disposing the sealing washer 12 in the mold at the time the annular resilient member 13 is molded in order that a firm, positive, vulcanized bond is obtained between these members so that the cork sealing washers are permanently retained upon the relatively broad inner face of the annular rubber member.

It will be seen that, due to the fact that the cork sealing washers are of slightly smaller diameter than the outside diameter of the shaft 9 with which they are associated, these washers will be tensioned slightly when slipped on the shaft and consequently cause a tensioning of the annular rubber member 13. It will further be appreciated that when this rubber member is clamped in position between the cover ring 16 and the housing 5 of the apparatus, a further tensioning of the ring will inherently take place due to molecular distortion thereof. This further tensioning serves to urge the sealing washers into engagement with the shaft and effect a tight seal therebetween. Inasmuch as the washers 12 are bonded to the rubber member 13, a tight seal is effected between these members at this point. Further, it will be apparent that inasmuch as the cover plate 16 serves to compress the radially outward portion of the rubber member 13, an effective seal is obtained between this rubber ring and the partition wall of the housing.

From the above described construction, it will be apparent that the shaft 9 is free to rotate or oscillate in its bearing bushing 8 and that this bearing bushing is protected from the water normally disposed interiorly of the housing 5 by means of the seal described above. It will be seen that the seal is inherently of such construction that it is radially urged toward the axis of rotation of the shaft and consequently tightly engages the peripheral surface of the shaft and thus provides a construction which virtually eliminates the possibility of axial movement of fluid along the shaft. Further, the construction obtains the inherent advantage that, as wear of the bearing takes place, or from other causes if the shaft becomes slightly eccentric, this eccentricity will merely serve to cause flexing of the rubber supporting ring 13 and will not serve to impose materially greater wear upon portions of the sealing washers 12. Further, it will be appreciated that inasmuch as a plurality of sealing washers 12 are utilized and further that these washers are virtually independently supported with respect to each other by means of the rubber ring, the washers will inherently constitute separate seals, each of which operates virtually independently of the other except for the fact that they are all urged radially toward the shaft by the same rubber ring.

In the modified form of the invention illustrated in Fig. 2 of the drawing, substantially the same general construction is shown except for the fact that a sealing member of somewhat different construction is utilized. In this form of the invention a shaft 25 is journaled for rotation in a bearing 26 press fitted into a support 27. The support 27 is secured to a housing 28 by means of an annular series of screws 29 susbtantially as described in connection with the preferred embodiment of the invention. The wall of the housing 28 is provided with an aperture therein, the marginal edge of which is slightly offset to provide a flange 30 adapted to afford clearance for the mounting of the improved sealing ring. The sealing ring in this form of the invention includes a plurality of sealing washers 31 which may be substantially identical in construction with the sealing washers 12 described above. These sealing washers are supported by means of a pair of resilient washers 32 which may cheaply and conveniently be blanked from sheet material and assembled with respect to the sealing washers 31 after they have been blanked out. The radial outward portions of the washers 32 are sealed to the housing by means of a cover plate 33 which is secured in position with respect to the housing by means of screws 29 in substantially the same manner as was described in connection with the preferred embodiment of the invention.

The rubber washers 32 are preferably of about the same thickness as the cork sealing washers 31 and are so mounted as to break joints therewith in order that each of the rubber washers serves to partially support two of the cork washers, thus materially contributing to the independence of the support of the sealing washers 31. It will be appreciated that this construction is extremely simple and cheap to manufacture and that substantially the same inherent advantages obtain as resulted from the construction disclosed in Fig. 1.

It has been found preferable in this form of the invention to construct the washers 32 of an inside diameter less than the outside diameter of the washers 31 in order that these latter will not only be tensionally urged into engagement with the shaft by their own resiliency but will be additionally urged thereagainst by the resilient washers 32.

In the further modified form of the invention illustrated in Fig. 3, a housing 40 has an aperture therein adapted to permit the passage of a shaft 41, which shaft is mounted for rotation in a bearing bushing 42 press fitted into a support member 43. This support member is secured to the housing by means of an annular series of screws 44 which also serve to secure in position a cover plate 45 serving to provide means for mounting the modified form of sealing ring shown herein. In this form of the invention a single rubber washer 46 may be molded or blanked out to provide an outside portion adapted to be clamped between the cover plate 45 and the wall of the housing 40 and a radially inward surface adapted to engage the peripheral surfaces of three sealing washers 47 substantially the same in general construction as the sealing washer 12 described above. It will be seen that the cross-sectional shape and configuration of the rubber washer 46 is such that the inner surface thereof which engages the sealing washers 47 is offset substantially from the radially outward portion which is clamped between the cover plate and the wall of the housing. This construction permits considerably easier flexing of the rubber supporting ring 46 such as may be necessary in the event that the mounting of the shaft is slightly eccentric with respect to the mounting of the rubber ring 46. It will be seen that in this form of the invention radial forces exerted upon the rubber ring 46 are easily absorbed by the ring and consequently it is necessary to make this ring somewhat thicker than the rings described above in order that the same tensioning of the sealing washers be obtained.

It will be appreciated from the foregoing that the beneficial results obtained from any of the three specific embodiments of the invention disclosed are all substantially analogous. In each instance a resilient ring is utilized for the purpose of effecting a positive engagement of relatively independently mounted sealing rings with respect to a rotatable shaft. It will be seen that this ring is mounted in such a manner that it conveniently absorbs slight radial movements of the shaft without subjecting the sealing rings to excessive wear. Further, it will be clear that the constructions are each relatively simple and cheap of manufacture and are mounted in such a manner that the entire assembly may easily and conveniently be replaced.

As has been explained above, the specific installation in which the sealing means disclosed in the embodiments of the invention shown in the drawing is immaterial to the present invention and many other and further uses and modifications thereof falling within the scope of the invention as defined in the subjoined claims will be clearly apparent to those skilled in the art.

I claim as my invention:

1. A seal for a rotating shaft comprising a sealing ring having an inside diameter less than the outside diameter of the shaft to be sealed, a two-part casing for supporting said ring axially including axially spaced radially extending walls abutting opposite axial end faces of said sealing ring, a resilient ring surrounding and bearing upon the outer circumferential surface of said sealing ring, said casing being adapted and arranged to exert radial compression on said resilient ring when secured in position and means for securing said casing walls together.

2. A seal for a rotating shaft comprising a sealing ring of granulated cork molded with a binder, said ring being of less inside diameter than the outside diameter of the shaft to be sealed, a two-part casing for supporting said ring axially including axially spaced radially extending walls abutting opposite end faces of said ring, a rubber ring surrounding and bearing upon the outer circumferential surface of said sealing ring, said casing being adapted and arranged to exert radial compression on said rubber ring when secured in position and means for securing said casing walls together.

ALFRED H. HABERSTUMP.